United States Patent
Sachidanandam et al.

(10) Patent No.: US 11,121,999 B2
(45) Date of Patent: Sep. 14, 2021

(54) COMMUNICATION INTERFACE FOR WEARABLE DEVICES

(71) Applicant: MICROSOFT TECHNOLOGY LICENSING, LLC, Redmond, WA (US)

(72) Inventors: Vignesh Sachidanandam, Redmond, WA (US); Gary Caldwell, Redmond, WA (US); Gautam Kedia, Redmond, WA (US); Hiroshi Tsukahara, Bellevue, WA (US); Ned Bearer Friend, Redmond, WA (US); Zachary Kahn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 759 days.

(21) Appl. No.: 14/927,827

(22) Filed: Oct. 30, 2015

(65) Prior Publication Data

US 2017/0126610 A1    May 4, 2017

(51) Int. Cl.
*H04L 12/58* (2006.01)
*G06Q 10/10* (2012.01)
(Continued)

(52) U.S. Cl.
CPC ............. *H04L 51/26* (2013.01); *G06F 1/163* (2013.01); *G06Q 10/109* (2013.01); *G06Q 50/01* (2013.01); *H04L 51/14* (2013.01)

(58) Field of Classification Search
USPC ....................................................... 709/206
See application file for complete search history.

(56) References Cited

U.S. PATENT DOCUMENTS 6,218,958 B1 *   4/2001   Eichstaedt ............... G08B 6/00
                                                      340/4.12
6,463,131 B1    10/2002   French-St. George et al.
(Continued)

FOREIGN PATENT DOCUMENTS

CN    102426510 A    4/2012
CN    102918823 A    2/2013
(Continued)

OTHER PUBLICATIONS

Don Konforty, Yuval Adam, Daniel Estrada, Lucius Gregory Meredith, "Synereo: The Decentralized and Distributed Social Network", Mar. 15, 2015.*
(Continued)

*Primary Examiner* — Umar Cheema
*Assistant Examiner* — John Fan
(74) *Attorney, Agent, or Firm* — Michael Best & Friedrich LLP

(57) ABSTRACT

Technologies are described related to communication interfaces for wearable devices. User experience with wearable devices may be enhanced through tailored views for communications, calendar items, actions associated with those, where the views and presentations may be dynamically selected and adjusted based on context, user, location, and device capabilities. Smart notifications and user-friendly note taking, functionality may be enabled also based on context, user, location, and device capabilities. Other scenarios may be unlocked based on proximity and/or sensor data.

19 Claims, 13 Drawing Sheets

(51) Int. Cl.
*G06Q 50/00* (2012.01)
*G06F 1/16* (2006.01)

(56) References Cited

U.S. PATENT DOCUMENTS

| | | | |
|---|---|---|---|
| 8,161,165 B2* | 4/2012 | Horvitz | G06Q 10/10 |
| | | | 455/414.1 |
| 8,626,554 B2 | 5/2014 | Chin | |
| 9,024,749 B2 | 5/2015 | Ratajczyk | |
| 2011/0252090 A1* | 10/2011 | Garcia, Jr. | H04L 12/1827 |
| | | | 709/204 |
| 2012/0004575 A1* | 1/2012 | Thorn | G06F 3/011 |
| | | | 600/587 |
| 2013/0106603 A1* | 5/2013 | Weast | G06F 1/163 |
| | | | 340/539.11 |
| 2013/0151623 A1* | 6/2013 | Weiser | H04N 7/147 |
| | | | 709/205 |
| 2013/0262298 A1 | 10/2013 | Morley | |
| 2014/0135036 A1 | 5/2014 | Bonanni et al. | |
| 2014/0181741 A1 | 6/2014 | Apacible et al. | |
| 2014/0280578 A1 | 9/2014 | Barat et al. | |
| 2015/0046370 A1 | 2/2015 | Libin et al. | |
| 2015/0058123 A1 | 2/2015 | Lenahan et al. | |
| 2015/0098309 A1 | 4/2015 | Adams et al. | |
| 2015/0105104 A1 | 4/2015 | Cherry et al. | |
| 2015/0185874 A1 | 7/2015 | Raffa et al. | |
| 2016/0103577 A1* | 4/2016 | Greenberg | B60K 35/00 |
| | | | 715/765 |

FOREIGN PATENT DOCUMENTS

| | | |
|---|---|---|
| CN | 103460727 A | 12/2013 |
| CN | 104469662 A | 3/2015 |
| CN | 104932679 A | 9/2015 |

OTHER PUBLICATIONS

Cketti, et al., "K-9 Mail for SmartWatch", Retrieved on: Sep. 29, 2015 Available at: https://play.google.com/store/apps/details?id=de.cketti.smartwatch.k9&hl=en.

Vasilyev, Kostya, "AquaMail SmartWatch Extra", Published on: Nov. 5, 2014 Available at: https://play.google.com/store/apps/details?id=org.kman.AquaMail.SmartExtra&hl=en.

Bashmakov, Pavlo, "Smartwatch User Interaction", Published on: Sep. 7, 2015 Available at: https://medium.com/mobile-design-and-ux/smartwatch-user-interaction-39601215a1b1.

Betters, Elyse, "What can Android Wear do? Here's all the Best Features explained, with Tips and Tricks", Published on: Jun. 28, 2014 Available at: http://www.pocket-lint.com/news/129634-what-can-android-wear-do-here-s-all-the-best-features-explained-with-tips-and-tricks.

"Handling Emails", Published on: Dec. 2, 2014 Available at: http://support.sonymobile.com/global-en/swr50/userguide/Email/.

Cipriani, Jason, "What you need to know about voice dictation on Pebble Time", Published on: May 27, 2015 Available at: http://www.cnet.com/how-to/pebble-time-voice-dictation-details-you-need-to-know/.

"International Search Report and Written Opinion Issued in PCT Application No. PCT/US2016/058341", dated Feb. 23, 2017, 12 Pages.

"Summons to Attend Oral Proceedings Issued in European Patent Application No. 16788929.4", dated Mar. 3, 2021, 10 Pages.

"First Office Action and Search Report Issued in Chinese Patent Application No. 201680063098.2", dated Apr. 9, 2021, 15 Pages.

"Office Action Issued in European Patent Application No. 16788929.4", dated Apr. 20, 2020, 5 Pages.

* cited by examiner

COMMUNICATION INTERFACE FOR WEARABLE DEVICES

BACKGROUND

Wearable devices are increasingly becoming popular and adopting functionalities traditionally provided by desktop, laptop, and handheld computing devices such as emails communications, calendaring, task management applications, notetaking applications, and comparable ones. However, due to their limited size for display and hardware capacity, functionality of applications on such devices may be subject to challenges. For example, it may be difficult to catch up with incoming email on a wearable device. Notification fatigue due to over-notifying on a wearable device or a fear of missing important communications (if notifications are turned off) may degrade user experience.

Additional challenges with wearable devices may include difficulty taking the right action to prevent losing track of incoming emails that have been reviewed on a wearable device, difficulty in quickly parsing necessary information in an incoming email, not knowing who a user is supposed to be meeting (near or during the meeting) or not being reminded of things a user wants to follow up with someone when they are near that person. Further challenges may include not leaving enough time to travel to meeting location when being reminded to leave for meeting, difficulty in quickly letting meeting attendees know they are running late, and inability to take quick reminder notes.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to communication interfaces for wearable devices. In some examples, one or more explicit rules and configurations may be received and attributes of a communication and history of interactions of a recipient of the communication may be analyzed. Next, a category and a priority level for the communication may be determined based on the one or more rules and configurations, one or more wearable device attributes, and an inference based on the analysis. The communication may then be presented according to the determined category and priority level. Categorized and prioritized actions associated with the presented communication may also be presented based on the context of the communication and/or the recipient.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
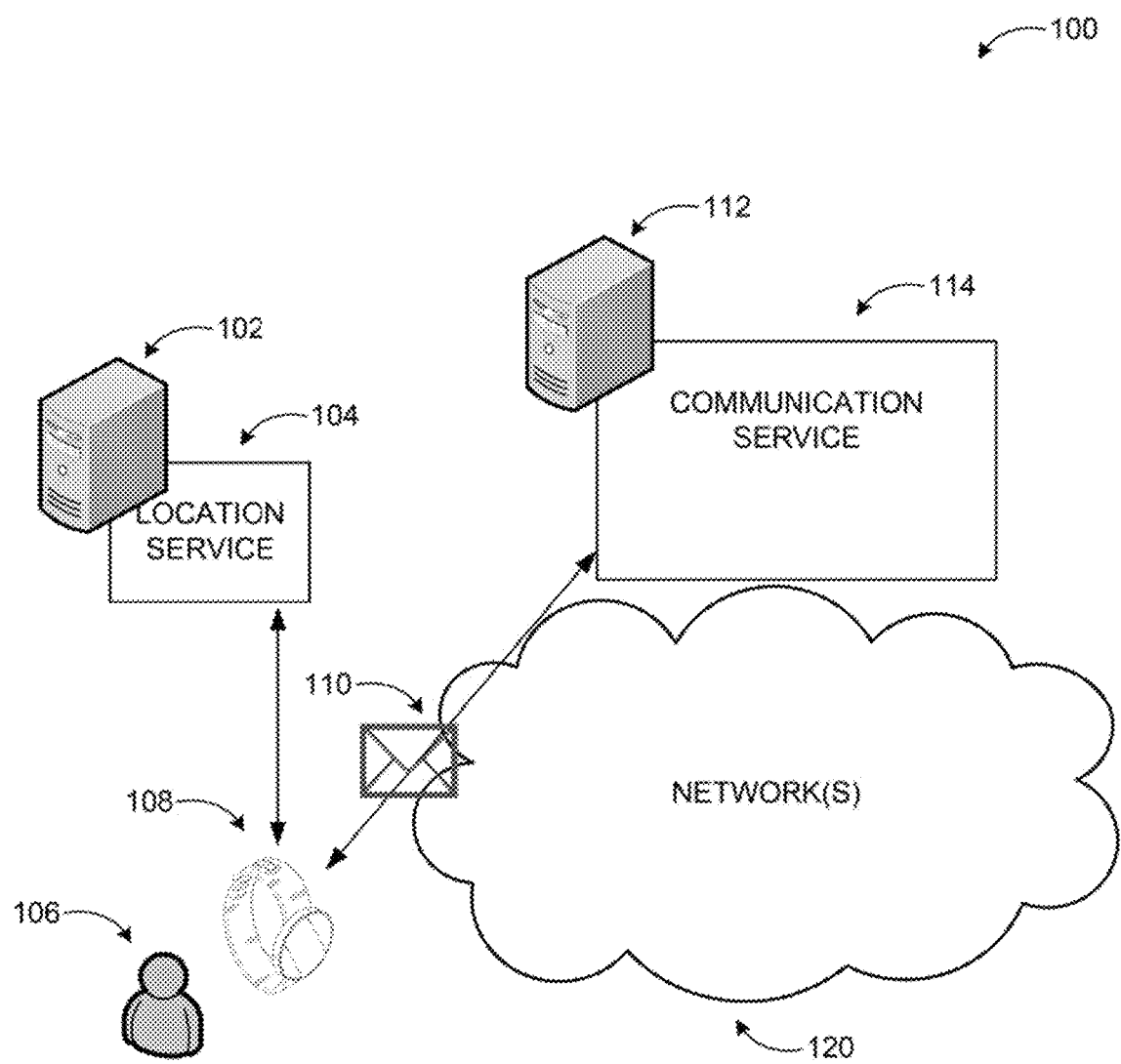
FIG. 1 illustrates an example architecture of a communication service in conjunction with a wearable device according to some embodiments.

As discussed above, user experience with wearable devices may be enhanced through tailored views for communications, calendar items, actions associated with those, where the views and presentations may be dynamically selected and adjusted based on context, user, location, and device capabilities. Smart notifications and user-friendly note taking functionality may be enabled also based cm context, user, location, and device capabilities. Other scenarios may be unlocked based on proximity and/or sensor data.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide a communication service. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example embodiments may be found in the following description.

The technical advantages of providing communication interfaces on wearable devices may include, among others, increased security and efficiency communication exchange such as emails and calendar items, reduced processing and network bandwidth usage (through selected and adjusted action presentations on displayed items), and improved user interaction by allowing users to view optimized presentations of communication items on a wearable device and take actions in an efficient manner.

Embodiments address a need that arises from very large scale of operations created by networked computing and cloud based services that cannot be managed by humans. The actions/operations described herein are not a mere use of a computer, but address results of as system that is as direct consequence of software used as a service such as task services offered in conjunction with the tasks.

FIG. 1 illustrates an example architecture of a communication service in conjunction with a wearable device according to some embodiments.

As shown in diagram 100, to wearable device 108 such as a smart watch may include applications that may access a variety of services executed by servers over one or more networks 120. For example, at location service 104 executed on server 102 may provide location based services based on a location of the user 106. Similarly, communication service 114 executed on server 112 may provide communication capabilities including, but not limited to, email 110, text messages, calendar scheduling, task management, note taking, and other services. Functionality of the applications may be distributed among the wearable device 108 and the respective servers depending on the configuration of the provided services, communication capabilities (e.g., long range wireless communication, short range wireless communication, etc.), and device capabilities (e.g., memory, processing capacity, etc.).

In some embodiments, communications such as emails calendar items, notes, tasks, and comparable ones may be displayed to a user in form of cards. Unseen cards may be ordered by relevance to help the user catch up with incoming email easily. In other examples, smart notifications may be employed that filter notifications and send only urgent and important notifications to the wearable device as a push notification, for example. In addition or instead, less intrusive pull mechanisms such as glance screens, or silently adding, cards to the stream may be used to make sure the user is in the loop on other incoming communications that may not be as urgent. Quick and easy note taking may be enabled through voice dictation from the wearable device that may be processed through voice recognition and emailed to the user or to an address identified by the user.

In yet other embodiments, smart actions may be provided that are dynamic based on the context of the communication or user such as an incoming message and the user's past interactions with messages containing similar properties and/or attributes. In further examples, smart meeting reminders may be provided that factor in, for example, traffic/travel time to meeting location using a current location of the user and likely travel method. Smart reminders may also be provided to follow up on items based on a physical proximity of the user to a person or location of the user, as well as time/date. In some embodiments, a quick and easy pull experience may be provided to provide information about the people the user is about to meet (e.g., contact information such as photo, title, organization, etc. automatically provided in response to gesture). The cards may be arranged such that smart message previews that pull out salient information are displayed. Furthermore, users may be enabled to notify attendees of a meeting about their estimated time of arrival based on location and travel information obtained by the wearable device automatically or manually.

Figure 2:
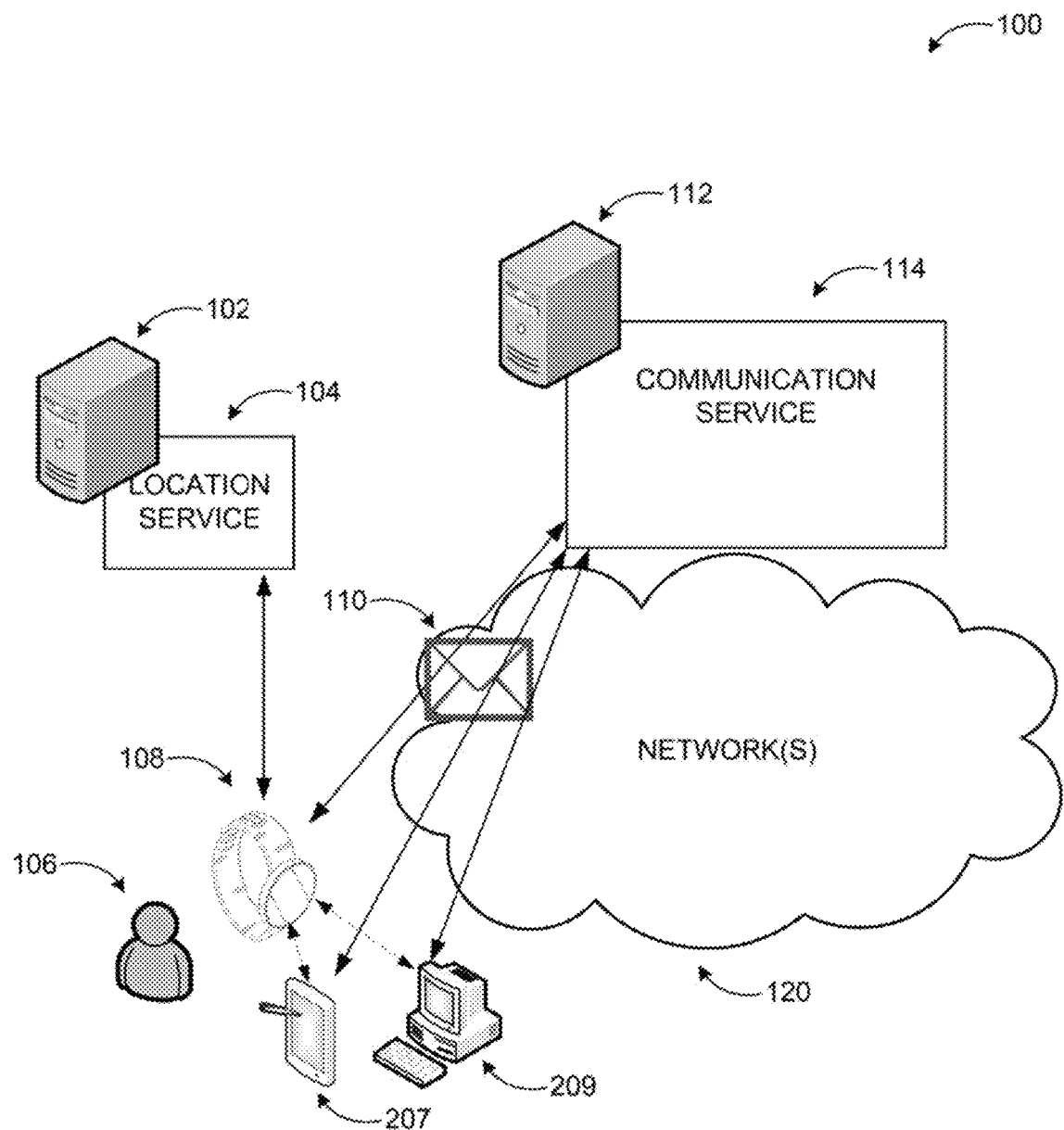
FIG. 2 illustrates another example architecture of a communication service in conjunction with a wearable device according to other embodiments.

FIG. 2 illustrates another example architecture of a communication service in conjunction with a wearable device according to other embodiments.

Diagram 200 shows another examples configuration of functionality and system architecture for a wearable device. Components numbered similarly in diagram 200 as in diagram 100 may be similar components with alike functionality. The wearable device 108 in diagram 200 may communicate with one or more other computing devices associated with the user 106 such a smart phone 207 and a desktop computer 209. Thus, some of the functionality may be performed by the other computing devices in addition to the functionality performed by the wearable device 108 or respective servers.

In addition to processing and/or functionality distribution, some applications on the wearable device 108 may take advantage of information on the other computing devices to perform some of the functionality described herein. For example, some example actions relate to context of user or application related operations. Such context information may be obtained from data at the other computing devices such as user's calendar information, contact information, stored communications, and the like.

Figure 3:
FIG. 3 illustrates example presentations of emails on a wearable device.

FIG. 3 illustrates example presentations of entails on a wearable device.

Diagram 300 shows example presentations of emails on a smart watch. Due to restricted display area and expected user attention (users may spend less time viewing, a display on a watch compared to a laptop or desktop computer, for example), emails or similar communications may be presented in an optimized fashion to the user. One of the approaches may include presenting information (communications and other information) in form of cards. A paged model may display a full email allowing users to easily parse the content of mails, and swipe (or use other gestures) to advance to the next mail when done reviewing an email item. Cards may be ordered based on the likelihood that the user may act on the email. That is, a first card may be the one the user is most likely to act on. The user's likelihood to act on an email item may be determined based on user context, user's history of interacting with similar items, etc. Cards may be presented in batches of items. If the number of unseen email exceeds a number for the batch, the last card in a current batch may allow the user to load a new batch of cards. Once the user has reviewed all emails, the display may be cleared, and a message may be displayed to the user indicating that they are caught up with all incoming email, for example.

Example screenshot 302 shows an email being presented with the sender, subject line, and summary content. Screenshot 304 shows an overview of unseen emails, where a number of new messages, brief message information (sender and summary subject line) may be displayed in a scrollable fashion. Screenshot 306 displays emails as in screenshot 302, but in a scrollable fashion. Screenshot 308 displays an email with full details.

Figure 4:
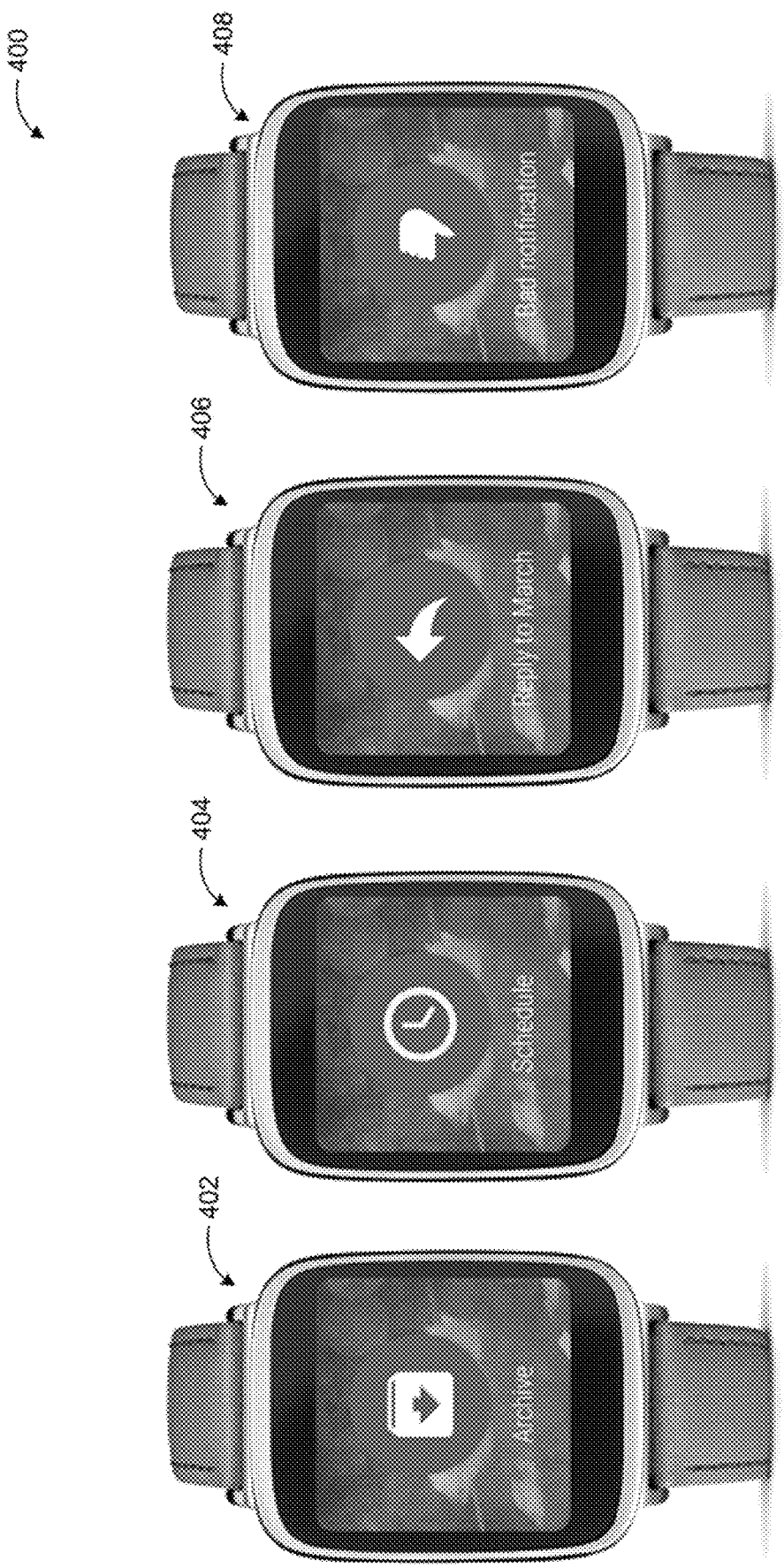
FIG. 4 illustrates example presentations of actions associated with presented items on a wearable device.

FIG. 4 illustrates example presentations of actions associated with presented items on a wearable device.

When a user decides to take an action in response to viewing a communication item, available/relevant actions may also be presented on the wearable device display in an optimized fashion. As shown in diagram 400, each action may be displayed on a single card according to a dynamically determined order based on context of the user, past user actions, context of the communication item, user location, time of day, and similar factors. In other examples, user preferences set on the same and/or another device (for example, archive as primary clean up command and schedule as primary mark command) may also be considered. Screenshots 402, 404, 406, and 408 show an archive action, a schedule action, a reply action, and a "had notification" action, which may be provided depending on one or more of the context factors described herein.

Figure 5:
FIG. 5 illustrates further example presentations of actions associated with presented items on a wearable device.

FIG. 5 illustrates further example presentations of actions associated with presented items on a wearable device.

Diagram 500 shows a further example of presenting available/relevant actions. If there are a high number of actions available associated with a presented communication item, the actions may be presented as two, three, four, etc. at a time to allow a user to see all available actions without having to perform a large number of interactions with the wearable device. Screenshots 502, 504, 506, and 508 illustrate actions associated with the "Design Priorities . . . " email in pairs. In other embodiments, more actions may be displayed on each card. The cards may be switched in response to gestures such as swipes or taps, audio commands, or activation of hardware elements such as buttons on the wearable device. An example scenario may include providing a user with a one tap action (in the notification) to move the communication item to a particular folder, if the system is confident that the user may move the communication item to that folder. Another example scenario ma include providing a user with a one tap action (in the notification) to schedule email to a particular date, if the system is confident that the user may want to follow up on the specific email on that date.

Figure 6:
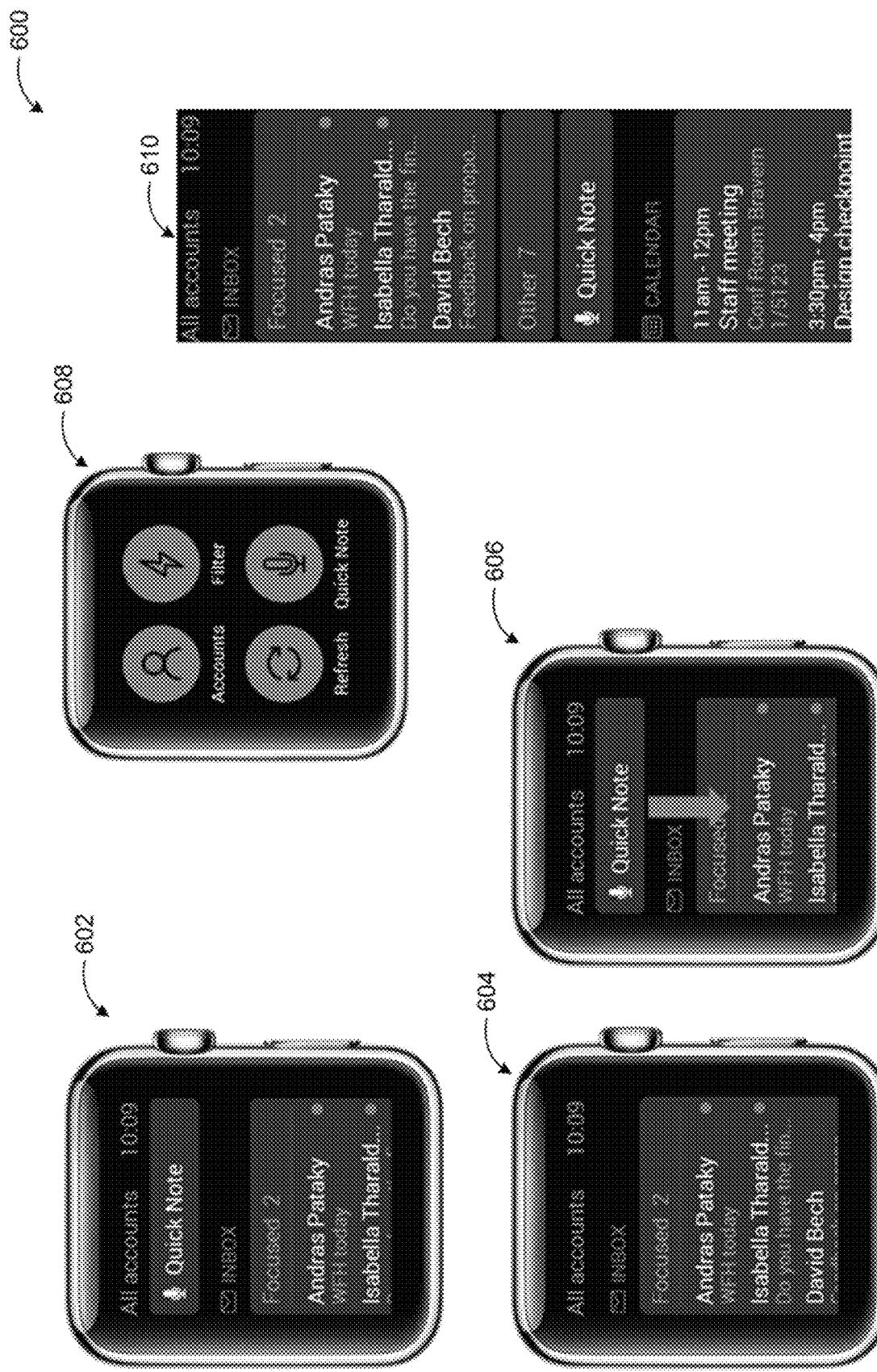
FIG. 6 illustrates example options for activation of a notetaking functionality on a wearable device.

FIG. 6 illustrates example options for activation of as notetaking functionality on a wearable device.

Some embodiments may provide a quick and easy flow to email or other destination via voice dictation from a wearable device. Users may be enabled to quickly instruct the system to send themselves or another person (e.g., their assistant) at note, and being launched into a voice dictation flow. The user may be able to send or edit their note if they choose after they see the voice dictation result. The email sent may be delivered immediately to the user's inbox, or to a time/place/content of the user's choice (triggering a notification at the time of arrival).

As shown in diagram 600, notetaking functionality may be activated through a variety of ways. Screenshot 602 shows an example, where the notetaking element may be permanently displayed along with other communication items. Screenshot 608 show a notetaking element displayed as a tap-on button along with other functionality buttons on the wearable device display. Screenshots 604 and 606 display another example configuration, where the notetaking element may be normally hidden and brought into display in response to a swipe down or similar) gesture pushing some of the other displayed items out of the display. Screenshot 610 shows the notetaking element being displayed at the bottom of email section of a scrollable user interface. Of course, the notetaking element may be displayed at any other location on the user interface.

Figure 7:
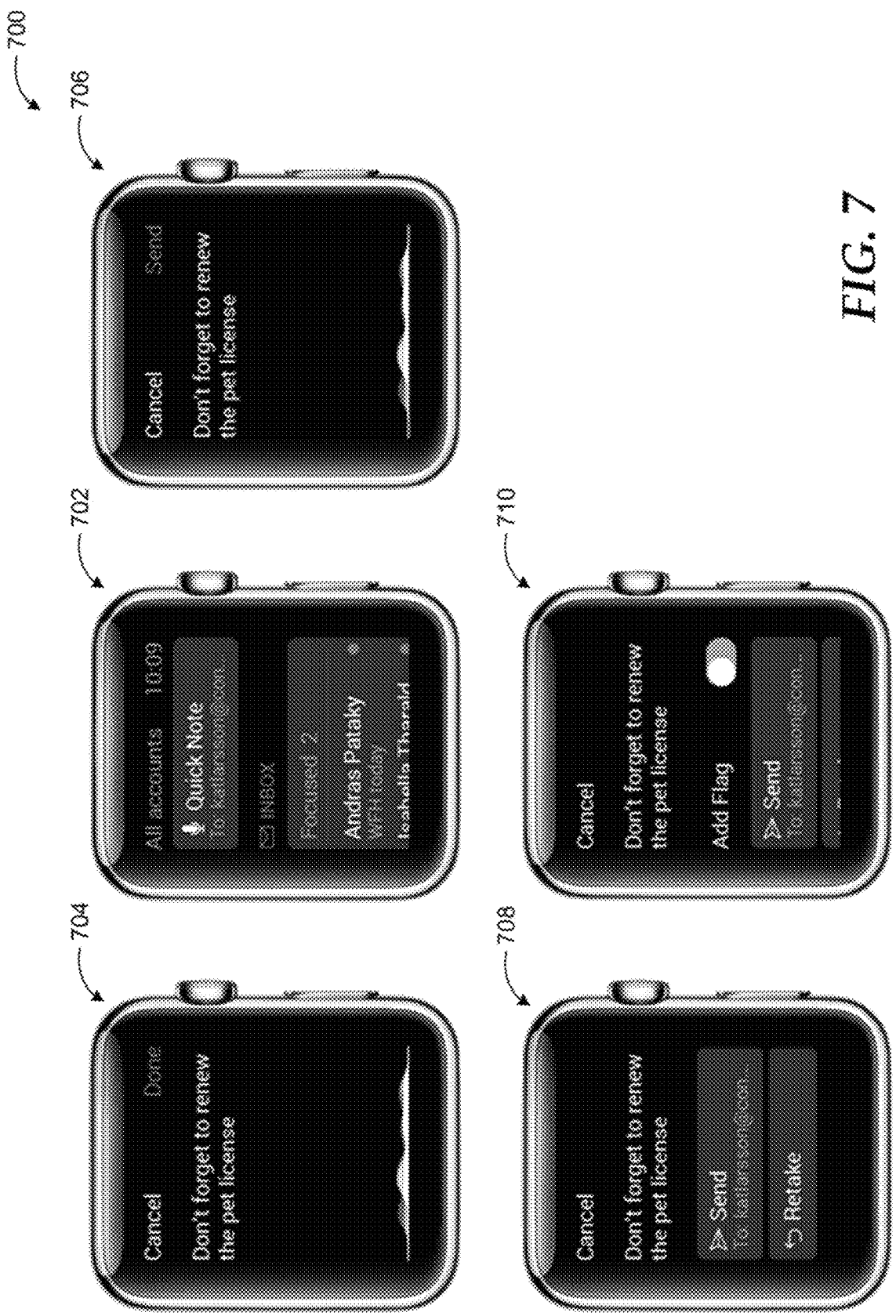
FIG. 7 illustrates example user interfaces for actions associated with voice-based notetaking on a wearable device.

FIG. 7 illustrates example user interfaces for actions associated with voice-based notetaking on a wearable device.

Diagram 700 shows flow of actions in quick notetaking on a wearable device. Screenshot 702 displays activation of as notetaking functionality while in an email view mode. A recording user interface as shown in screenshot 704. A textual version of the recorded note may be displayed as feedback to the user and the user may be provided with options to cancel or accept the note as recorded. Upon acceptance of the recorded note, the user may be provided with the option to send the note as shown in screenshot 706. In some embodiments, the send or retake options may be provided together m one screen as shown on screenshot 708. The user may also be enabled to assign attributes to the recorded note such as adding a flag as shown in screenshot 710.

Figure 8:
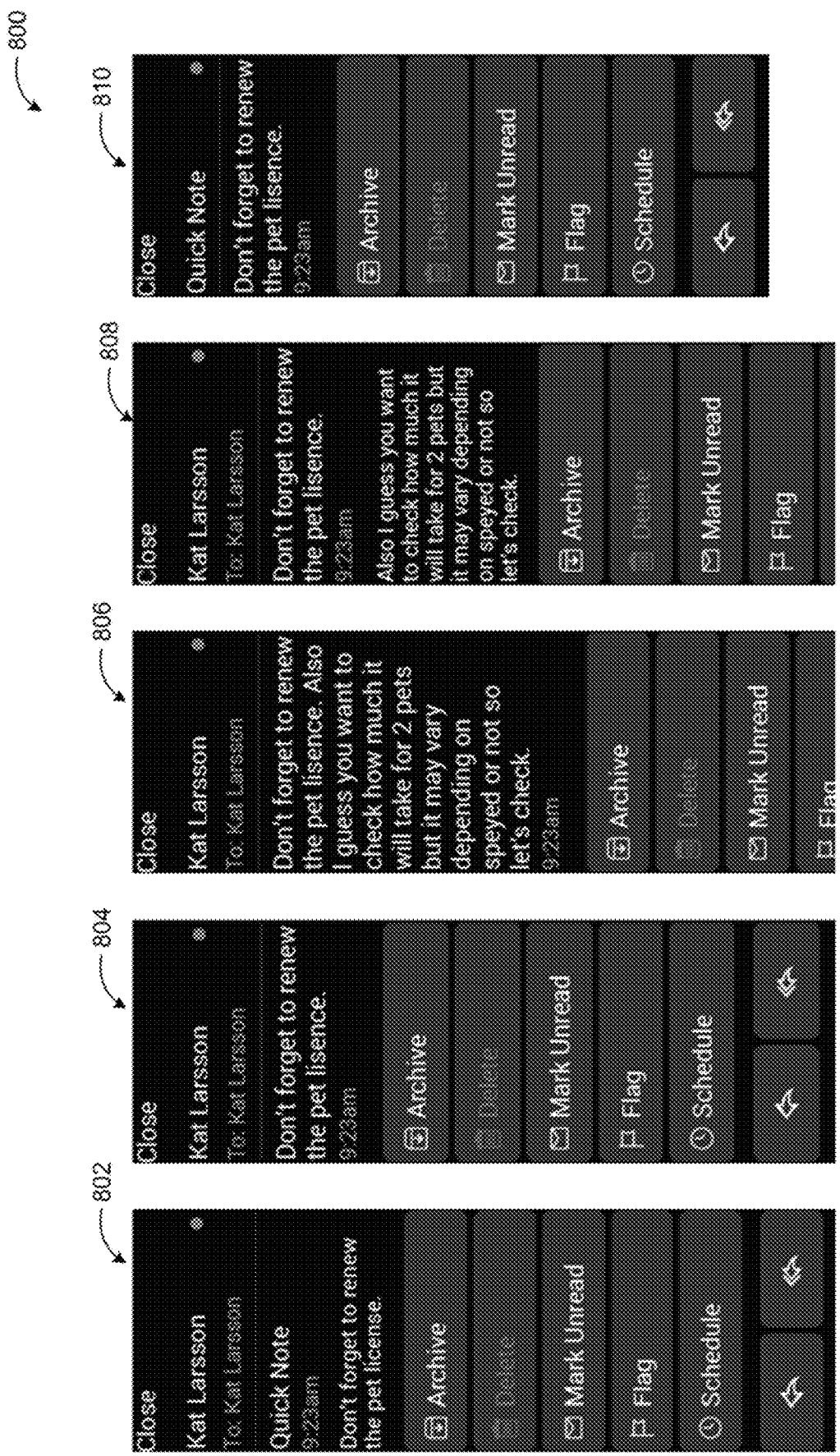
FIG. 8 illustrates example presentations of recorded notes on as wearable device.

FIG. 8 illustrates example presentations of recorded notes on a wearable device.

One of the example configurations for quick notetaking is sending the recorded note as an email to the user himself/herself. Once sent, the note may appear similar to other emails in the user's inbox. However, since the note does not have a separate subject line, there may be different ways of displaying it. Screenshot 802 shows one example, where the user's name may be listed as sender and recipient, the subject line may be "Quick Note" (or similar), and a first portion of the note may be displayed as body of the note in an email user interface along with actions applicable to the note as a received email.

Screenshot 804 shows another configuration, where a first portion of the note may be displayed as subject line of the email and body hidden for space preservation purposes. Screenshot 806 shows a further configuration, where the entire note may be displayed as the body of the email. In yet another example, shown in screenshot 808, the first portion of the note may be displayed as subject line, while the remainder is shown in the body of the email. In a further example, the subject line may be shown as "Quick Note" or similar) and the first portion of the note shown as body to preserve space on the displayed user interface, as shown in screenshot 810. Other configurations using the principles described herein may also be implemented.

Figure 9:
FIG. 9 illustrates example presentations of communication and calendar items on wearable device.

FIG. 9 illustrates example presentations of communication and calendar items on wearable device.

In some embodiments, entails that the user is likely to act on may trigger a notification on wearable devices. A system according to embodiments may determine which device the user is using and a current context the user is in (location, time, status, etc.), and notify appropriately based on the device/context and additional computed information about the incoming email itself, and how likely a user is to act on it. Examples of determining which emails are notification worthy in a given context may include location or status such as at home, at work, walking, driving, in a meeting, a meeting approaching, and comparable ones with various combinations of which devices are being used actively. The system may also determine which device to notify for these emails (different wearable devices, phone, or other computers the user may be using at a given time). A continuous experience may be provided when a notification is received and/or acted on from a particular device, and the user then moves to another device (for example, displaying and/or clearing the notification based on user activity with the notification on the displayed device). Emails that are deemed to not be notification worthy may be added to the stream of information the user can access at any given time, to enable serendipitous discovery of the new content (without causing an interruption for items that are not deemed important).

For example, the system may consider the following as signals before deciding whether to notify a user (or not) to an incoming email or similar item (calendar item, text message, task): sender information (and relationship to recipient), subject, content of email, any tags associated with the email (for example, ones related to the recipient), recipient availability (based on calendar data), recipient activity (seated, on the go, driving, in a meeting, etc.), recipient location, recipient interaction with previous content in conversation or previous conversations with sender, implied due dates and tasks in content in email, other recipients of email, and/or usage of other email client applications at that time.

Other embodiments may provide smart message previews that pull out salient information. The system may determine salient information (for the recipient) in an incoming message and display that information in the notification on the wearable device. Example signals may include formatting of content, tags in the message, mentions of recipient name in content, position of a tag associated with the recipient, content around the recipient mention, implied due dates and tasks in content, images, charts, etc. present in email body, and comparable ones.

Further embodiments may provide smart actions that are dynamic based on the incoming message (and user's past interactions with message containing similar properties/attributes). A dynamic set of actions that vary depending on characteristics of each email and the user's past interactions with entails containing similar characteristics may be presented in an optimized fashion to allow the user to activate a selected action easily and quickly on a wearable device. Examples may include providing a user with a one tap action (in the notification) to move to as particular folder, if the system is confident that the user may move the specific email to that folder. Another example may include providing a user with a one tap action (in the notification) to schedule email to a particular date, if the system is confident that the user may want to follow up on the specific email on that date.

Example user interface configurations in diagram 900 include screenshot 902, where unseen emails may be displayed in a categorized fashion based on system determined priority (e.g., "focused" category, relevance, etc.); screenshot 904, where other categories deemed to have lesser priority may be displayed in a collapsed fashion; screenshot 906, where sender information may be presented along with the message from the sender to provide recipient context; and screenshot 908, where upon completing review of all unseen or prioritized emails, the user may be presented with a message indicating that they have caught up with incoming messages. This may also provide an incentive to the users to review their messages.

Figure 10:
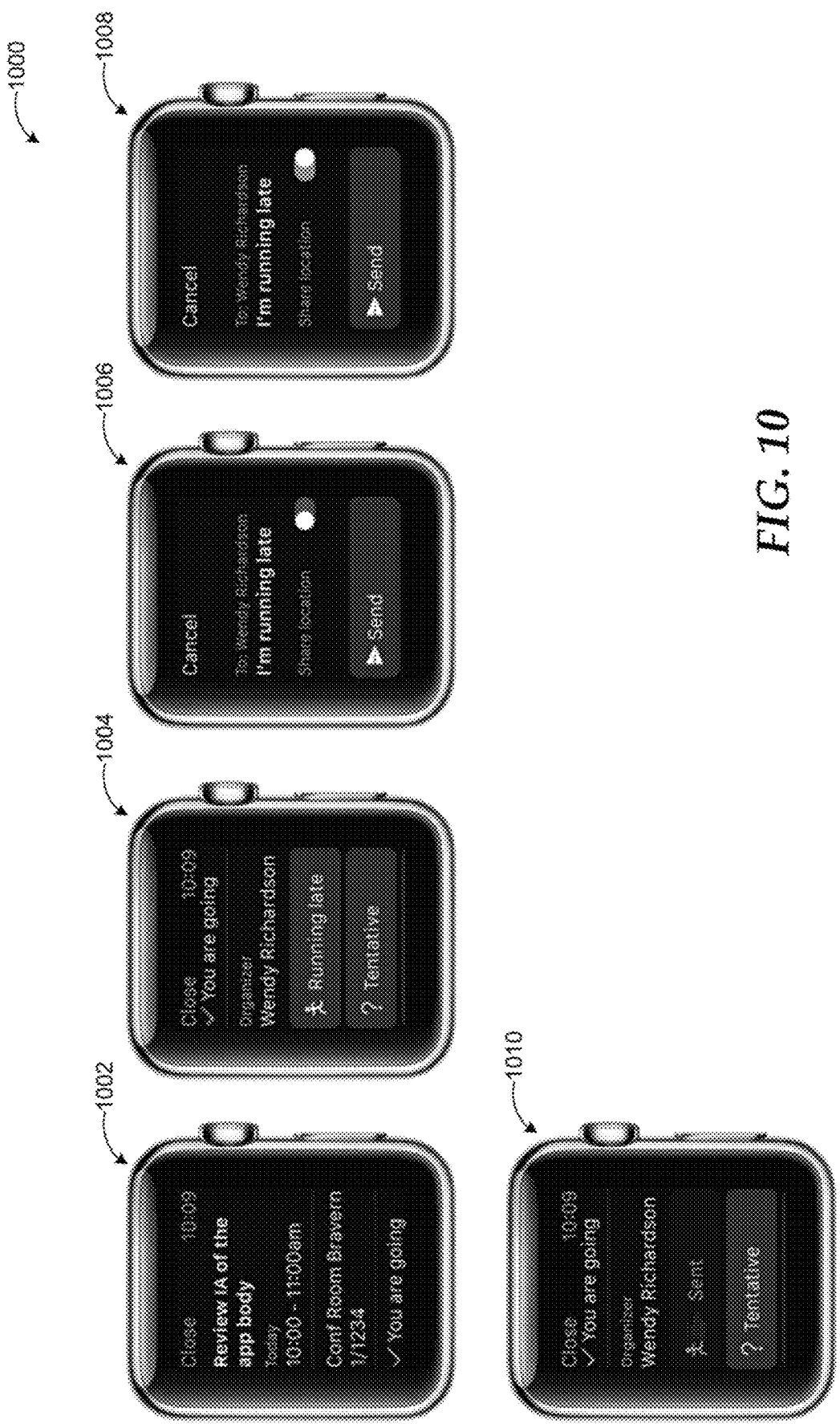
FIG. 10 illustrates example user interface associated with alerting meeting attendees on a wearable device.

FIG. 10 illustrates example user interface associated with alerting meeting attendees on a wearable device.

Diagram 1000 includes an initial status display associated with a meeting to be attended by the user in screenshot 1002. Screenshot 1004 shows how the user may be presented with a status update such as being late to the meeting and an option to change the attendance status, for example. Upon detecting the user's continued intention to attend the meeting either through user input or through inference (e.g., the user moving in the direction of the meeting room), the system may display an option to transmit a message to one or more meeting attendees indicating the user is running late as shown in screenshot 1006. As shown in screenshot 1008, the user may be presented with an option to share their location with the recipient(s) of their "running late" message. For example, the message may indicate to the recipient(s) an expected arrival time of the user. Screenshot 1010 shows the user interface with the message indicated as having been sent.

Thus, some embodiments provide smart meeting reminders that may take into consideration traffic, travel time to meeting location, and similar factors using current location and likely travel method. This is in contrast to static meeting reminders (e.g., 15 mins before meeting). The user may be notified or reminded based on these factors, such that they can reach their meeting on time.

Embodiments further provide a mechanism to schedule an email to be re-delivered or user notified based on physical proximity with another person. Short range sensors on wearable devices may be used to track locations of both users, and trigger a notification to the user who scheduled the email when the users are both near each other.

Further embodiments may provide a quick and easy pull experience to learn more about the people a user is about to meet. A system according to embodiments may present cards of information on meeting attendees when the user is close to or enters a meeting. Information displayed may include photos, names, titles, and/or organizational information for meeting attendees. The system may be configured to schedule the display of information in a smart way to prevent showing information at unhelpful or wrong times. Example signals for displaying the information may include time, user activity (seated, on the go, etc.), user location, device network status (connected to wireless network, etc.), proximity of device to devices used by other meeting attendees, and/or calendar information (e.g., user's accept/tentative/decline status).

The example scenarios and schemas in FIG. 1 through 10 are shown with specific components, data types, and configurations. Embodiments are not limited to systems according to these example configurations. Communication interfaces for wearable devices may be implemented in configurations employing fewer or additional components in applications and user interfaces. Furthermore, the example schema and components shown in FIG. 1 through 10 and their subcomponents may be implemented in a similar manner with other values using the principles described herein.

Figure 11:
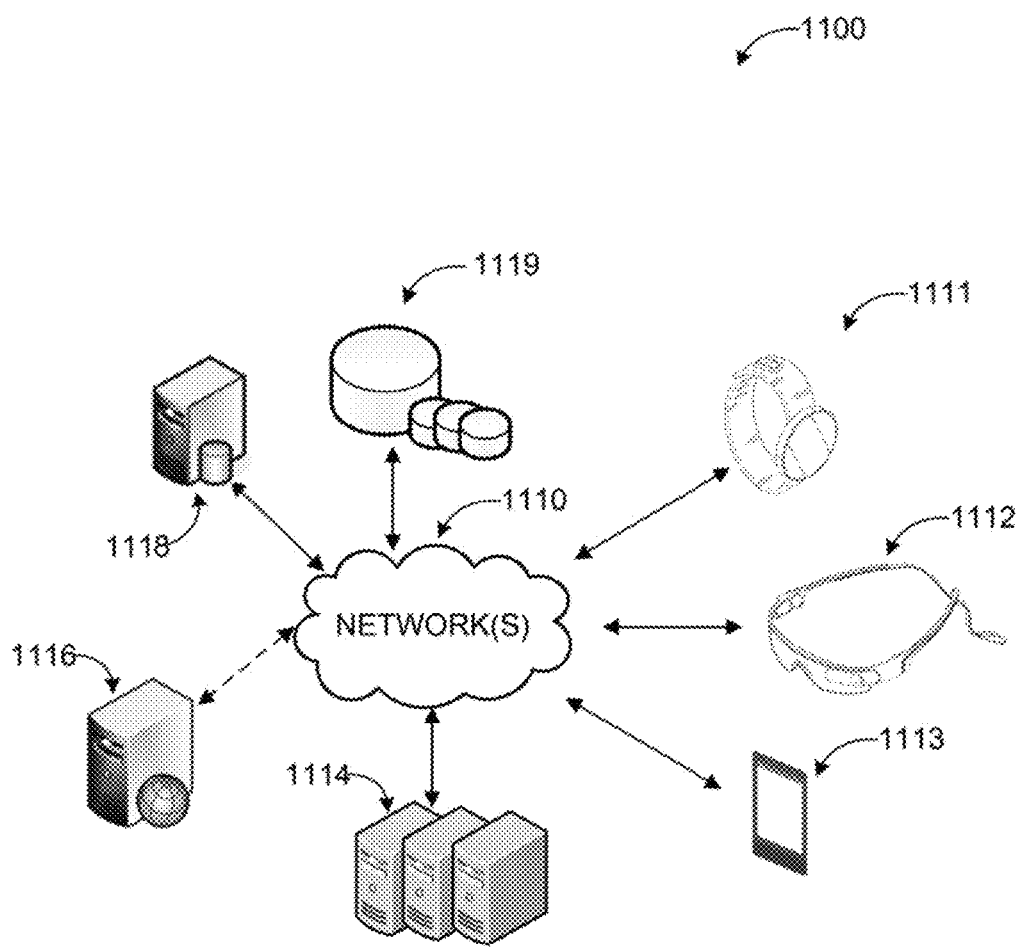
FIG. 11 is an example networked environment, arranged in accordance with at least some embodiments described herein.

FIG. 11 is an example networked environment, where embodiments may be implemented.

As shown in a diagram 1100, a communication service providing email and other communication services such as calendar items, notes, and tasks, may be implemented in a networked environment over one or more networks such as network 1110. Users may access the emails (and other communication services) through locally installed or thin (e.g., browser) client applications executed on a variety of computing devices such as smart watch 1111, augmented reality glasses 1112, or smart phone 1113. User experience with wearable devices may be enhanced through tailored views for communications, calendar items, actions associated with those, where the views and presentations may be dynamically selected and adjusted based on context, user, location, and device capabilities. Smart notifications and user-friendly note taking functionality may be enabled also based on context, user, location, and device capabilities.

A communication service, as discussed herein, may be implemented via software executed over servers 1114. The servers 1114 may include one or more processing servers 1116, where at least one of the one or more processing servers 1116 may be configured to execute one or more applications associated with the communication service. In other examples, the communication service may be provided b a third party service or may include a web application. The communication service may store data associated with data in a data store 1119 directly or through a database server 1118.

The network 1110 may comprise any topology of servers, clients, Internet service providers, and communication media. A system according to embodiments may have a static or dynamic topology. The network 1110 may include multiple secure networks, such as an enterprise network, an unsecure network, or the Internet. The unsecure network may include a wireless open network. The network 1110 may also coordinate communication over other networks, such as Public Switched Telephone Network (PSTN) or cellular networks. Furthermore, the network 1110 may include multiple short-range wireless networks, such as Bluetooth, or similar ones. The network 1110 may provide communication between the nodes described herein. By way of example, and not limitation, the network 1110 may include wireless media. The wireless media may include, among others, acoustic media, RF media, infrared media, and other wireless media.

Many other configurations of the computing devices, the applications, the data sources, and the data distribution systems may be employed to provide communication interfaces for wearable devices. Furthermore, the networked environments discussed in FIG. 11 are for illustration purposes only. Embodiments are not limited to the example applications, modules, or processes.

Figure 12:
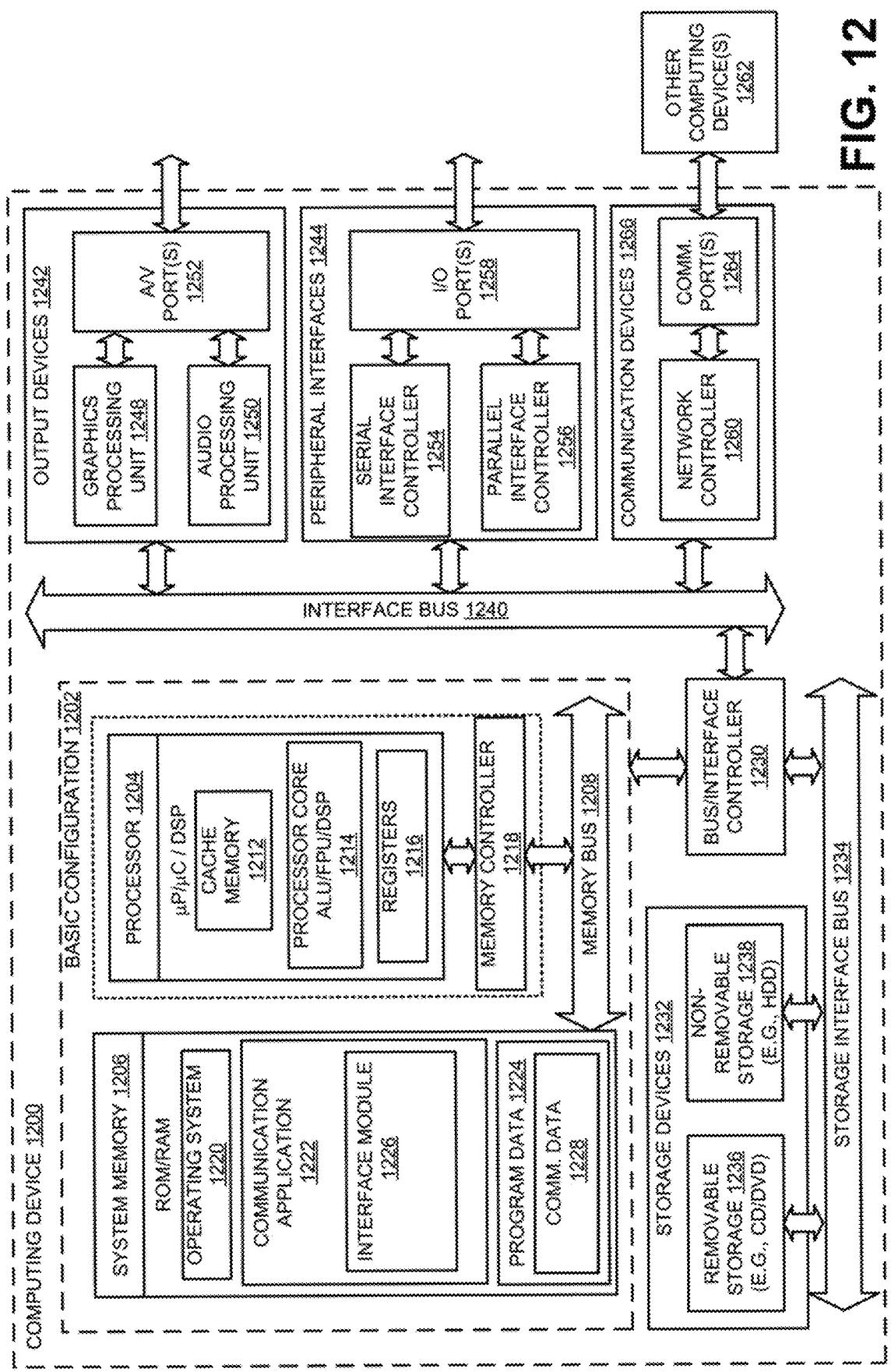
FIG. 12 illustrates a general purpose computing device, which may be configured to provide a communication interface on wearable devices, arranged in accordance with at least some embodiments described herein.

FIG. 12 illustrates a general purpose computing device, which may be configured to provide communication interfaces for wearable devices, arranged in accordance with at least some embodiments described herein.

For example, a computing device 1200 may be a wearable computer, as discussed herein. As such, the computing device 1200 may have fewer components than those shown in FIG. 12 in some examples. In an example of a configuration 1202, the computing device 1200 may include a processor 1204 and a system memory 1206. The processor 1204 may include multiple processors. A memory bus 1208 may be used for communication between the processor 1204 and the system memory 1206. The basic configuration 1202 may be illustrated in FIG. 12 by those components within the inner dashed line.

Depending on the desired configuration, the processor 1204 may be of any type, including, but not limited to, a microprocessor (µP), a microcontroller (µC), a digital signal processor (DSP), or any combination thereof. The processor 1204 may include one more levels of caching, such as a level cache memory 1212, a processor core 1214, and registers 1216. The processor core 1214 may include an arithmetic logic unit (ALU), a floating point unit (FPU), a digital signal processing core (DSP Core), or any combination thereof. A memory controller 1218 may also be used with the processor 1204, or in some implementations, the memory controller 1218 may be an internal part of the processor 1204.

Depending on the desired configuration, the system memory 1206 may be of any type including but not limited to volatile memory (such as RAM), non-volatile memory (such as ROM, flash memory, etc.), or any combination thereof. The system memory 1206 may include an operating system 1220, at communication application 1222, and program data 1224. The communication application 1222 may include an interface module 1226, which may provide the functionality discussed herein. Program data 1224 may include, among others, communication data 1228.

The computing device 1200 may have additional features or functionality, and additional interfaces to facilitate communications between the basic configuration 1202 and any desired devices and interfaces. For example, a bus/interface controller 1230 may be used to facilitate communications between the basic configuration 1202 and data storage devices 1232 via a storage interface bus 1234. The data storage devices 1232 may be removable storage devices 1236, non-removable storage devices 1238, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few, although some of these example devices may be impractical to implement in a wearable device. Example computer storage media may include volatile and nonvolatile, removable, and non-removable media implemented in any method or technology for storage of information, such as computer-readable instructions, data structures, program modules, or other data.

The system memory 1206, the removable storage devices 1236, and the non-removable storage devices 1238 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 1200. Any such computer storage media may be part of the computing device 1700.

The computing device 1200 may also include an interface bus 1240 for facilitating communication from various interface devices (for example, one or more output devices 1242, one or more peripheral interfaces 1244, and one or more communication devices 1266) to the basic configuration 1202 via the bus/interface controller 1230. The one or more output devices 1242 may include a graphics processing unit 1248 and an audio processing unit 1250, which may be configured to communicate to various external devices, such as a display or speakers via one or more A/V ports 1252. The one or more peripheral interfaces 1244 may include a serial interface controller 1254 or a parallel interface controller 1256, which may be configured to communicate with external devices, such as input devices (for example, keyboard, mouse, pen, voice input device, touch input device, etc.) or other peripheral devices (for example, printer, scanner, etc.) via one or more I/O ports 1258. The one or more communication devices 1266 may include a network controller 1260, which may be arranged to facilitate communications with one or more other computing devices 1262 over a network communication link via one or more communication ports 1264. The one or more other computing devices 1262 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 1200 may be implemented as a wearable device such as a smart watch, a wearable augmented reality display, or other wearable devices.

Example embodiments may also include methods to provide communication interfaces for wearable devices. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 13:
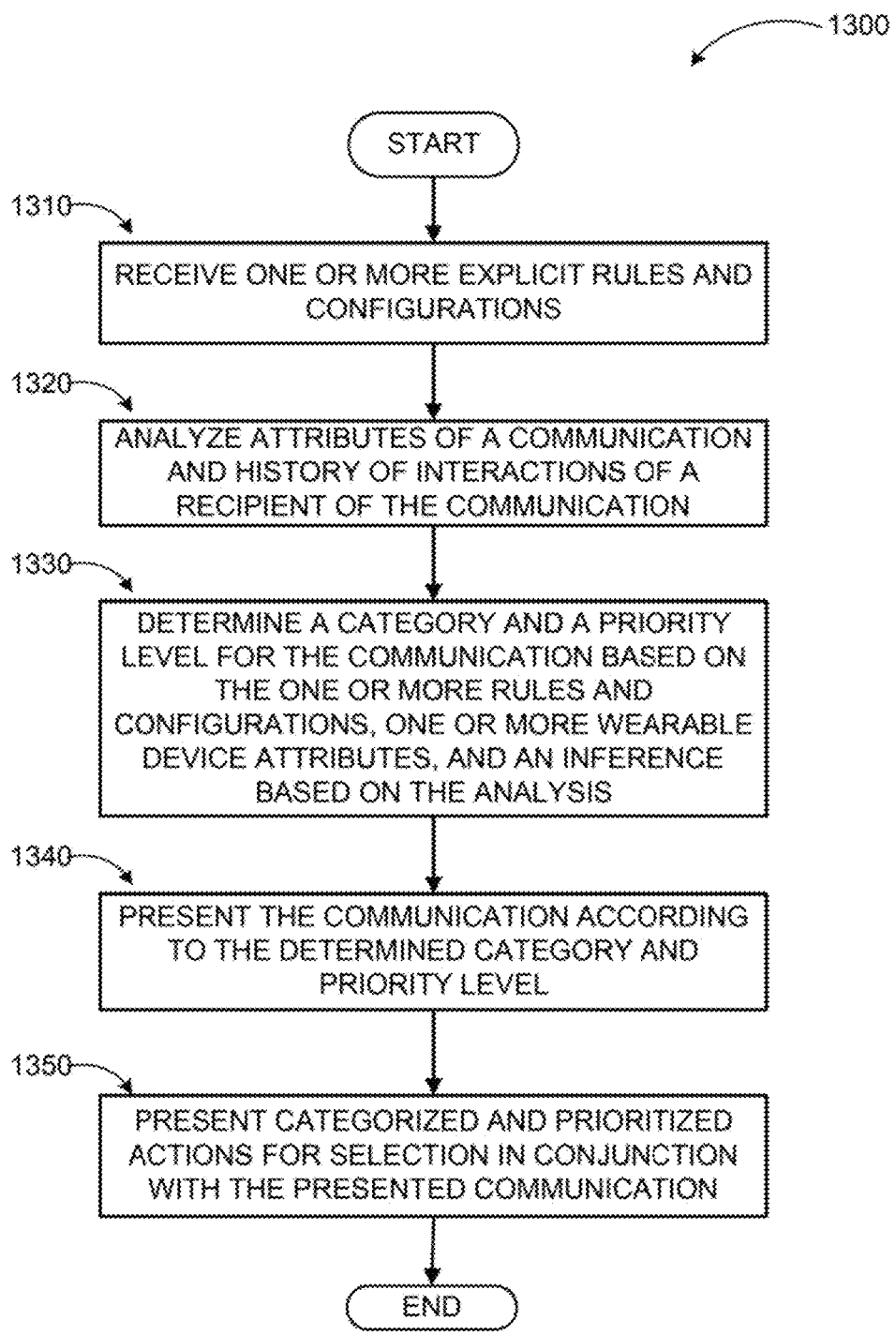
FIG. 13 illustrates a logic flow diagram for an example process to provide a communication interface on wearable devices, arranged in accordance with at least some embodiments described herein.

FIG. 13 illustrates a logic flow diagram for an example process to provide communication interfaces for wearable devices, arranged in accordance with at least some embodiments described herein.

A process 1300 may be implemented by a communication application and/or its components. A process to provide prioritized and categorized presentation of communications on a wearable device may begin with operation 1310, where one or more explicit rules and configuration may be received. The rules and/or configuration may be default rules or configurations, user defined custom rules or configurations, or organization defined rule or configurations based on a membership of a user in an organization (e.g., enterprise).

At operation 1320, attributes of a communication and history of interactions of a recipient of the communication may be analyzed to determine one or more actions likely to be taken by the recipient in response to the communication and a prioritization of the actions. At operation 1330, a category and a priority level may be determined for the communication based on the one or more rules and configurations, one or more wearable device attributes, and an inference based on the analysis. The communication may be presented according to the determined category and priority level at operation 1340. At operation 1350, the actions in response to the communication may be presented according to the determined priorities.

The operations included in process 1300 are for illustration purposes. Communication interfaces for wearable devices, according to embodiments, may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing prioritized and categorized presentation of communications on a wearable device is described. The means may include a means for receiving one or more explicit rules and configurations; a means for analyzing attributes of a communication and history of interactions of a user associated with the communication; a means for determining a category and a priority level for the communication based on the one or more rules and configurations, one or more wearable device attributes, and an inference based on the analysis; and a means for presenting the communication according to the determined category and priority level.

According to some examples, a wearable computing device to provide prioritized and categorized presentation of communications is described. The wearable computing device may include a communication module configured to communicate wirelessly with one or more other computing devices; a memory; and one or more processors coupled to the memory and the communication module, the one or more processors executing a communication application in conjunction with instructions stored in the memory. The communication application may include an interface module configured to receive one or more explicit rules and configurations; analyze attributes of a communication and history of interactions of as recipient of the communication; determine a category and a priority level for the communication based on the one or more rules and configurations, one or more attributes of the wearable computing device, and an inference based on the analysis; and determine one or more actions based on the communication and a category and a priority level for the one or more actions. The communication application may also include a display module configured to display the communication according to the determined category and priority level for the communication; and display the one or more actions according to the determined category and priority level for the one or more actions.

According to other examples, the communication and the one or more actions may be displayed in form of cards, and an order and content of the cards may be determined based on a context of the recipient and the communication. The context may be determined based on one or more of as location of the recipient, as status of the recipient, and a number and a type of other computing devices actively used by the recipient. The interface module may be configured to provide a continuous experience when a notification is received or acted on across multiple computing devices associated with the recipient.

According to further examples, the continuous experience may include one or more of displaying and clearing the notification based on user activity across the multiple computing devices associated with the recipient. The interface module may be configured to determine the category and the priority level of the communication and the one or more actions based on one or more of sender information, a subject of the communication, content of the communication, one or more tags associated with the communication, a recipient availability, a recipient activity, a recipient location, a recipient interaction with previous content in a conversation or previous conversations with a sender of the communication, implied due dates and tasks in the content of the communication, other recipients of the communication, and usage of other communication applications.

According to yet other examples, the communication may be one of an email, a calendar item, a text message, a task, and a note. The one or more other computing devices may include a desktop computer associated with the recipient, a desktop computer associated with the recipient, a laptop computer associated with the recipient, a handheld computer associated with the recipient, a vehicle computer associated with the recipient, a smart phone associated with the recipient, and a server. The interface module maybe further configured to present an incentive message to the recipient upon completion of review of all unseen communications.

According to other examples, at method executed at one or more computing devices to provide prioritized and categorized presentation of communications on a wearable device is described. The method may include receiving one or more explicit rules and configurations; analyzing attributes of a communication history of interactions of a user associated with the communication; determining a category and a priority level for the communication based on the one or more rules and configurations, one or more wearable device attributes, and an inference based on the analysis; and presenting the communication according to the determined category and priority level.

According to some examples, the method may also include determining salient information for the user in the communication and displaying the salient information in form of a card notification on the wearable device. Determining the salient information may be based on one or more of formatting of content of the communication, one or more tags in the communication, a mention of the user's name in the content, a position of a tag associated with the user, a portion of the content around the mention of the user's name, one or more implied due dates and tasks in the content, one or more images in the content, and one or more charts in the content. The method may further include activating a notetaking functionality in response to one of a gesture, an audio command, and a hardware element activation on the wearable device; recording an audio note dictated by the user; converting the recorded audio note to text; and forwarding the text to a predefined destination.

According to yet other examples, the predefined destination may be one or more of an email inbox of the user, an email inbox of one or more people designated by the user, and a data storage location. The method may also include enabling the user to assign one or more attributes to the text prior to forwarding to the predefined destination. The method may further include displaying the forwarded text in form of an email to the user, where a subject line of the email is one of an indication that the email is a recorded audio note and a first portion of the recorded audio note. The method may yet include displaying one or more actions to be selected in conjunction with the email to the user.

According to further examples, a computer-readable memory device with instructions stored thereon to provide communication interfaces on wearable devices is described. The instructions may include receiving, one or more explicit rules and configurations; analyzing attributes of a communication and history of interactions of a recipient of the communication; determining a category and a priority level for the communication based on the one or more rules and configurations, one or more attributes of the wearable computing device, and an inference based on the analysis; determining one or more actions based on the communication and a category and a priority level for the one or more actions; displaying the communication according to the determined category and priority level for the communication; and displaying the one or more actions according to the determined category and priority level for the one or more actions.

According to some examples, the instructions may also include determining an upcoming meeting to be attended by the recipient; determining a location and a movement of the recipient; and displaying a reminder notification to the recipient based on a time of the upcoming meeting, the location and the movement of the recipient. The instructions may further include if the recipient is determined to be late to the upcoming meeting, presenting the recipient with an option to transmit a message to one or more attendees of the meeting about arriving late.

In yet other examples, cards may be added to the stream/glance screen when conditions are not satisfied for an active notification to enable serendipitous discovery of the content.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A wearable computing device to provide prioritized and categorized presentation of communications, the wearable computing device comprising:
   a communication interface configured to communicate wirelessly with one or more other computing devices;
   a memory; and
   one or more processors coupled to the memory and the communication interface, the one or more processors executing a communication application in conjunction with instructions stored in the memory, wherein the one or more processors are configured to:
   analyze attributes of a communication and a history of interactions of a recipient of the communication;
   determine one or more actions associated with the communication based on the analysis;
   dynamically select and adjust a content for one or more cards to be displayed on the wearable computing device based on the determined one or more actions;
   determine a likelihood of recipient interaction with each of the one or more cards based on a context of the recipient and the history of interactions of the recipient;

dynamically select and adjust an order of the one or more cards to be displayed on the wearable computing device based on the determined likelihood of recipient interaction with each of the one or more cards; and display the ordered one or more cards on the wearable computing device.

2. The wearable computing device of claim 1, wherein the context is determined based on one or more of a location of the recipient, a status of the recipient, and a number and a type of other computing devices actively used by the recipient.

3. The wearable computing device of claim 1, wherein the one or more processors are further configured to provide a continuous experience when a notification is received or acted on across multiple computing devices associated with the recipient.

4. The wearable computing device of claim 3, wherein the continuous experience includes one or more of displaying and clearing the notification based on user activity across the multiple computing devices associated with the recipient.

5. The wearable computing device of claim 1, wherein the one or more processors are further configured to determine a category and a priority level of the communication and the determined one or more actions based on one or more of sender information, a subject of the communication, content of the communication, one or more tags associated with the communication, a recipient availability, a recipient activity, a recipient location, a recipient interaction with previous content in a conversation or previous conversations with a sender of the communication, implied due dates and tasks in the content of the communication, other recipients of the communication, and usage of other communication applications.

6. The wearable computing device of claim 1, wherein the communication is one of an email, a calendar item, a text message, a task, and a note.

7. The wearable computing device of claim 1, wherein the one or more other computing devices include a desktop computer associated with the recipient, a laptop computer associated with the recipient, a handheld computer associated with the recipient, a vehicle computer associated with the recipient, a smart phone associated with the recipient, and a server.

8. The wearable computing device of claim 1, wherein the one or more processors are further configured to present an incentive message to the recipient upon completion of review of all unseen communications.

9. A method executed at one or more computing devices to provide prioritized and categorized presentation of communications on a wearable device, the method comprising:

analyzing attributes of a communication and a history of interactions of a user associated with the communication;

determining one or more actions associated with the communication based on the analysis;

dynamically selecting and adjusting a content for one or more cards to be displayed on the wearable device based on the determined one or more actions;

determining a likelihood of user interaction with each of the one or more cards based on a context of the user and the history of interactions of the user;

dynamically selecting and adjusting an order of the one or more cards to be displayed on the wearable device based on the determined likelihood of user interaction with each of the one or more cards; and displaying the ordered one or more cards on the wearable device.

10. The method of claim 9, further comprising:
determining salient information for the user in the communication; and
selecting the salient information as the content for the one or more cards to be displayed on the wearable device.

11. The method of claim 10, wherein determining the salient information is based on one or more of:
formatting of content of the communication, one or more tags in the communication, a mention of the user's name in the content, a position of a tag associated with the user, a portion of the content around the mention of the user's name, one or more implied due dates and tasks in the content, one or more images in the content, and one or more charts in the content.

12. The method of claim 9, further comprising:
activating a notetaking functionality in response to one of a gesture, an audio command, and a hardware element activation on the wearable device;
recording an audio note dictated by the user;
converting the recorded audio note to text; and
forwarding the text to a predefined destination.

13. The method of claim 12, wherein the predefined destination is one or more of an email inbox of the user, an email inbox of one or more people designated by the user, and a data storage location.

14. The method of claim 12, further comprising:
enabling the user to assign one or more attributes to the text prior to forwarding to the predefined destination.

15. The method of claim 12, further comprising:
displaying the forwarded text in form of an email to the user, wherein a subject line of the email is one of an indication that the email is a recorded audio note and a first portion of the recorded audio note.

16. The method of claim 15, further comprising:
displaying one or more actions to be selected in conjunction with the email to the user.

17. A computer-readable memory device with instructions stored thereon to provide communication interfaces on wearable devices, the instructions comprising:
analyzing attributes of a communication and a history of interactions of a recipient of the communication;
determining one or more actions associated with the communication based on the analysis;
dynamically selecting and adjusting a content for one or more cards to be displayed on a wearable computing device based on the determined one or more actions;
determining a likelihood of recipient interaction with each of the one or more cards based on a context of the recipient and the hi story of interactions of the recipient; and
dynamically selecting and adjusting an order of the one or more cards to be displayed on the wearable computing device based on the determined likelihood of recipient interaction with each of the one or more cards; and
displaying the ordered one or more cards on the wearable computing device.

18. The computer-readable memory device of claim 17, wherein the instructions further comprise:
determining an upcoming meeting to be attended by the recipient;
determining a location and a movement of the recipient; and
displaying a reminder notification to the recipient based on a time of the upcoming meeting, the location and the movement of the recipient.

19. The computer-readable memory device of claim 18, wherein the instructions further comprise:
   if the recipient is determined to be late to the upcoming meeting, presenting the recipient with an option to transmit a message to one or more attendees of the meeting about arriving late.

\* \* \* \* \*